(12) United States Patent
Das et al.

(10) Patent No.: US 9,063,826 B2
(45) Date of Patent: Jun. 23, 2015

(54) PROCESS MAPPING IN PARALLEL COMPUTING

(75) Inventors: Dibyendu Das, Bangalore (IN);
Nagarajan Kathiresan, Bangalore (IN);
Rajan Ravindran, Bangalore (IN);
Bhaskaran Venkatsubramaniam,
Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 820 days.

(21) Appl. No.: 13/304,799

(22) Filed: Nov. 28, 2011

(65) Prior Publication Data

US 2013/0138929 A1    May 30, 2013

(51) Int. Cl.
*G06F 9/45* (2006.01)
*G06F 12/00* (2006.01)
*G06F 9/50* (2006.01)

(52) U.S. Cl.
CPC .............. *G06F 12/00* (2013.01); *G06F 9/5066* (2013.01)

(58) Field of Classification Search
None
See application file for complete search history.

(56) References Cited

U.S. PATENT DOCUMENTS 6,253,372 B1 * 6/2001 Komatsu et al. .............. 717/149
2007/0174558 A1   7/2007 Jia et al.

OTHER PUBLICATIONS

Implementing the MPI Process Topology Mechanism, J. L. Traff, Proceedings of the IEEE/ACM SC2002 Conf., 14 pages.
"Performance Impace of Process Mapping on Small-Scale SMP Clusers—A Case Study Using High Performance Linpack", T. Leng et al, Proceedings of the International Parallel and Distributed Processing Symposium, IEEE 2002, 8 pages.

* cited by examiner

*Primary Examiner* — Qamrun Nahar
(74) *Attorney, Agent, or Firm* — Garg Law Firm, PLLC; Rakesh Garg; Parashos Kalaitzis

(57) ABSTRACT

A method of mapping processes to processors in a parallel computing environment where a parallel application is to be run on a cluster of nodes wherein at least one of the nodes has multiple processors sharing a common memory, the method comprising using compiler based communication analysis to map Message Passing Interface processes to processors on the nodes, whereby at least some more heavily communicating processes are mapped to processors within nodes. Other methods, apparatus, and computer readable media are also provided.

6 Claims, 6 Drawing Sheets

| | | | |
|---|---|---|---|
| MPI_Send | int foo(<br>  int rank, int sz)<br>{<br>  return(rank % 4 <=1)<br>} | SELF | int foo2(<br>  int rank, int sz) {<br>  return rank + 2;<br>} | int foo3(<br>  int rank, int sz) {<br>  return 100; } |
| MPI_Recv | int foo4(<br>  int rank, int sz)<br>{<br>  return(rank % 4 >1)<br>} | int foo5(<br>  int rank, int sz) {<br>  return rank - 2;<br>} | SELF | int foo7(<br>  int rank, int sz) {<br>  return 100; } |

PROCESS MAPPING IN PARALLEL COMPUTING

BACKGROUND

High performance computing (HPC) involves the use of parallel supercomputers and/or computer clusters. A computer cluster is a computing system that consists of multiple (usually mass-produced) processors linked together forming a single system.

Parallel computing typically refers to the simultaneous use of multiple computer resources to solve a computational problem. The multiple computer resources could be a single computer with multiple processors, an arbitrary number of computers or nodes connected via a network, or a combination thereof.

Parallel computing saves time and is advantageous for solving larger problems. Parallel computing is currently used in a number of industry segments, which for example include, the energy industry (e.g. for seismic analysis, and reservoir analysis), the financial industry (e.g., for derivative analysis, actuarial analysis, asset liability management, portfolio risk analysis, and statistical analysis), manufacturing (e.g., for mechanical or electric design, process simulation, finite element analysis, and failure analysis), life sciences (e.g., for drug discovery, protein folding, and medical imaging), media (e.g., for bandwidth consumption analysis, digital rendering, and gaming), government (e.g., for collaborative research, weather analysis, and high energy physics, etc. Uses of such parallel computing in other areas are of course possible.

In high performance computing, multiple types of parallel computer architectures exist, which for example include shared multiprocessor systems and distributed memory systems. For example, a Shared Multi-Processor (SMP) system typically includes multiple processors sharing a common memory system.

In a distributed memory system, a cluster is defined by multiple nodes that communicate with each other using a high speed interconnect. A node typically includes a collection of cores or processors that share a single address space. Each node has its own CPU, memory, operating system, and I/O subsystem (e.g., a computer box with one or multiple processors or cores is a node). In a distributed memory system, a master node is typically assigned, which is configured to divide work between several slave nodes communicatively connected to the master node. The slave nodes work on their respective tasks and intercommunicate among themselves if there is any need to do so. The slave nodes return back to the master node. The master node assembles the results and further distributes work.

A SMP is more expensive and less scalable than a Massively Parallel Processor (MPP) system. However, programming is easier in an MPP system because all data is available to all processors.

A disadvantage with a distributed memory system is that each node has access to only its own memory. A further disadvantage is that data structures must be duplicated and sent over the network if other nodes want access to them, leading to network problems.

In high performance computing, there are multiple programming models. There is a single program multiple data (SPMD) model and a multiple program multiple data (MPMD) model. In a SPMD model, a single program is run on multiple processors with different data. In a MPMD model, different programs are run on different processors and different tasks may use different data.

For SPMD, in order to have an executable program run on multiple CPUs, a protocol or interface is required to obtain parallelism. Methods to obtain parallelism include automatic parallelization (auto-parallel), requiring no source code modification, open multi-processing (OpenMP), requiring slight source code modification, or a message passing system such as Message Passing Interface (MPI), a standard requiring extensive source code modification. Hybrids such as auto-parallel and MPI or OpenMP and MPI are also possible.

Two versions of the MPI standard are currently popular: Version 1.2 (MPI-1), and Version 2.1 (MPI-2). MPI has become a de facto standard for communication among processes that model a parallel program running on a distributed memory system. Most MPI implementations consist of a specific set (library) of routines (API) that can be called from Fortran, C, C++, or from any other language capable of interfacing with such routine libraries.

The assignee of the present application is an implementer of the MPI standard. Also, an implementation known as MPICH is available from the Argonne National Laboratory's website www.anl.gov. Argonne National Laboratory has continued developing MPICH, and now offers MPICH 2, which is an implementation of the MPI standard.

An example of an MPI call is init MPI_Init(int *argc, char ***argv), used for MPI initialization, which is the first routine called.

Different processes have ID numbers known as ranks. Ranks are used to identify the source and destination of a message, as well as to allow different processors to execute different code simultaneously. Rank is defined as a number ranging from 0 to size-1 (where size is the total number of processes), which identifies a process uniquely. The rank of each running process in an MPI application is set up by an MPI call MPI_Comm_Rank( ) at runtime. The ranks remain unchanged throughout the lifetime of the MPI application.

Point-to-point communication is communication between two processes. A source process sends a message to a destination process. A destination process receives the message. Communication takes place within a communicator. The destination process is identified by its rank within the communicator. MPIs send calls include MPI_Send (Standard), which lets MPI decide whether outgoing messages will be buffered; MPI_BSend (Buffered), which can be started whether or not a matching receive has been posted, which may complete before a matching receive has been posted, MPI_SSend (Synchronous), which can be started whether or not a matching receive as been posted and which will complete successfully only if a matching receive is posted; and MPI_RSend(Ready) which completes immediately and which can be started only if the matching receive has already been posted.

MPI_Bcast is an MPI call using which a selected processor broadcasts or sends to all other processors. MPI_Scatter( ) spreads an array to other processors. The source is an array on the sending processor. Each receiver, including the sender, gets a piece of the array corresponding to its rank in the communicator.

These are just a few of multiple function calls available for MPI. Others can easily be learned by reviewing readily available information about MPI.

SUMMARY

In the current day scenario, communication costs on any network channel are much higher than the communication cost using shared memory. Hence, embodiments of the invention provide systems and methods for mapping the heavily communicating MPI Processes to the same node on a cluster of single/multi-core SMP's to effectively reduce communication overheads.

Various embodiments of the invention provide a method of mapping processes to processors in a parallel computing environment where a parallel application is to be run on a cluster of nodes wherein at least one of the nodes has multiple processors sharing a common memory, the method uses compiler based communication analysis to map Message Passing Interface (MPI) processes to processors on the nodes, where at least some more heavily communicating processes are mapped to processors within nodes.

BRIEF DESCRIPTION OF THE VIEWS OF THE DRAWINGS

FIG. 2 is an exemplary embodiment of a rank mapping table in accordance with various embodiments.

DETAILED DESCRIPTION

Figure 1:
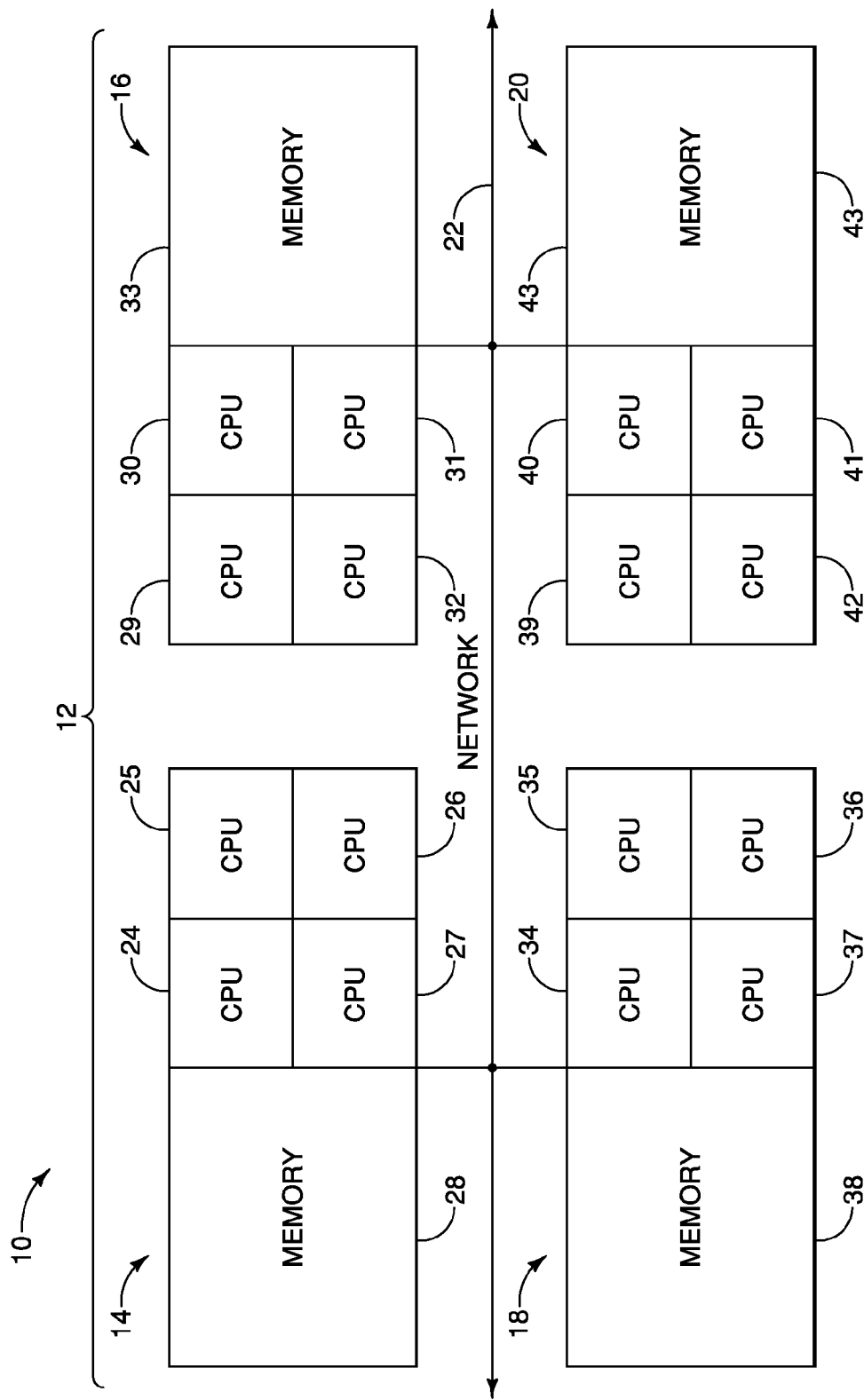
FIG. 1 is an exemplary embodiment of a block diagram of a multi-core or multiprocessor system in accordance with various embodiments.

FIG. 1 is an exemplary embodiment of a block diagram of a system 10 according to various embodiments of the invention. System 10 includes a cluster 12 of nodes 14, 16, 18, 20, etc. coupled together by a network or high speed interconnect 22. Node 14 includes a plurality of processors or cores 24-27 sharing a common memory 28, node 16 includes a plurality of processors or cores 29-32 sharing a common memory 33, node 18 includes a plurality of processors or cores 34-37 sharing a common memory 38, node 20 includes a plurality of processors or cores 39-42 sharing a common memory 43, etc. While FIG. 1 shows four processors or cores in each node, it should be obvious to one skilled in the art that others numbers of cores or processors can be included in a each node that is sharing a common memory.

In the illustrated embodiment, node 14 includes cores or processors 24-27 and memory 28 in a first housing; node 16 includes cores or processors 29-32 and memory 33 in a second housing, node 18 includes cores or processors 34-37 and memory 38 in a third housing, node 20 includes cores or processors 39-42 and memory 43 in a fourth housing, etc.

In a scenario when a parallel application is run on a cluster 12 of single or multi-core SMP's, it would be preferable to have the heavily communicating processes run on the same node, as far as possible. This way, some part of the communication bottleneck is laid off since it avoids network communication and uses high speed shared memory between the cores or the processors, and will thereby result in improving the performance of the system.

Given a parallel application (e.g., in a single program, multiple data programming model), it is non-trivial to effectively map the MPI processes to the processors on the nodes. At least a single run of an application must be made with monitoring tools incorporated into the run to understand the communication pattern. One approach to achieve this is to attach the application with trace libraries (e.g., MPI Trace) that provide the communication details at the end of the run. It should be obvious to one skilled in the art that several other approaches may be adopted to achieve this result. This way, the communication pattern is identified and the mapping is done manually.

Embodiments of the invention related to use the compiler based communication analysis to effectively map the MPI processes to the processors on the nodes, which can be achieved preferably without any human intervention (automatically). This approach brings down the above said two step process to a single step, allowing communication overheads to be reduced for certain classes of applications transparently without any user interaction.

In some embodiments of the invention, a compiler performs the following at compile time:
1. Collects all the MPI point-point communication calls when communicator is MPI_COMM_WORLD (e.g., collect rank of source, rank of destination and number of bytes transferred); and
2. Uses this data to create a table 50 (see FIG. 2) referred to herein as a Rank Mapping table.

Figure 5:
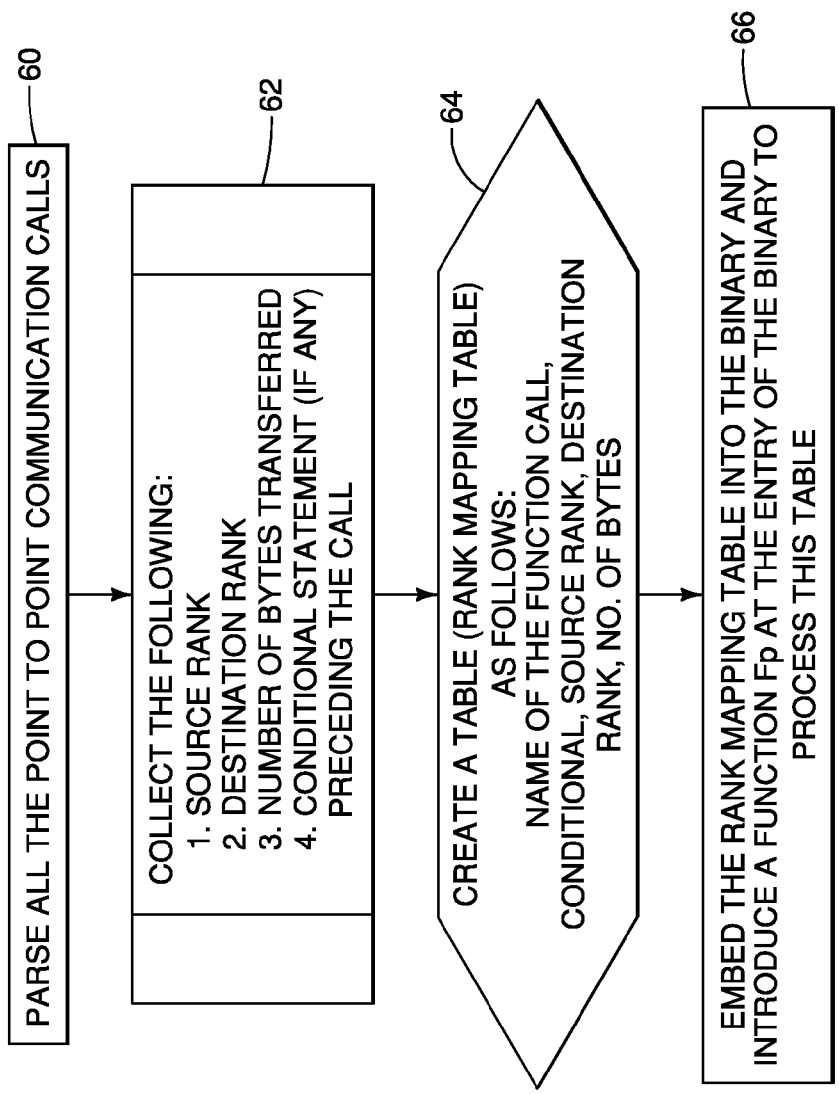
FIG. 5 is an exemplary embodiment of a flowchart illustrating a compile time process.

A detailed flowchart of steps performed at compile time is provided as an exemplary embodiment in FIG. 5. In step 60, all point to point communication calls are parsed. In step 62, for respective communication calls, the following are collected: source rank, destination rank, number of bytes transferred, and conditional statement (if any) preceding the communication call.

Figure 6:
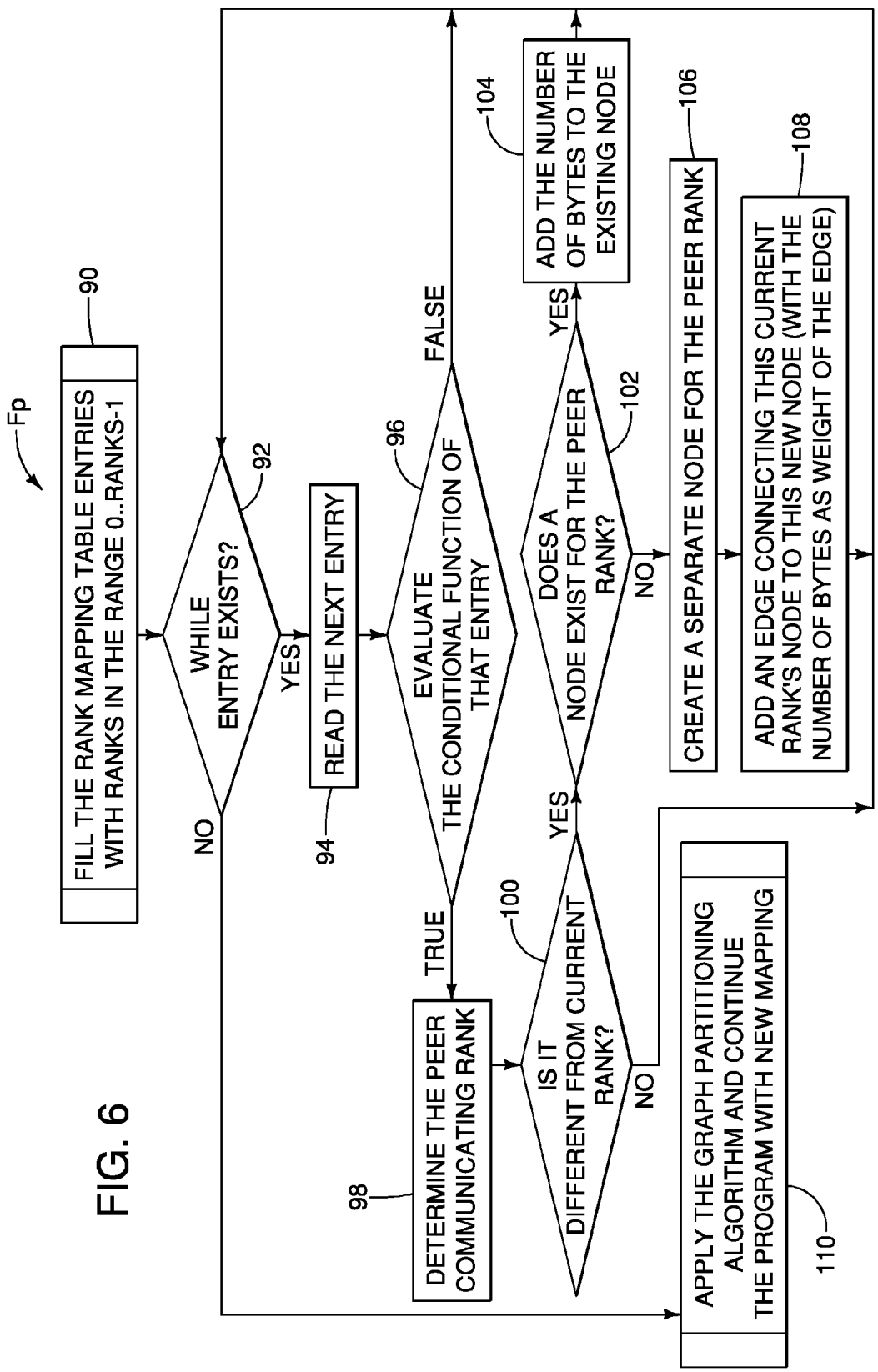
FIG. 6 is an exemplary embodiment of a flowchart of a function Fp in accordance with various embodiments.

In step 64, the rank mapping table 50 is created which includes entries for name of the function call, conditional, source rank, destination rank, and number of bytes. In step 66, the rank mapping table 50 is embedded into the binary (object file) and a function Fp is introduced at the entry of the binary to process the table. FIG. 6 provides an exemplary embodiment of an appropriate function Fp, in accordance with some embodiments, and will be described in greater detail below.

In the illustrated embodiment of the invention, each entry of the table 50 corresponds to a unique point-point communication. More particularly, in some embodiments of the invention, respective entries of the table point to the following information:

Call signature or name;
Conditional—a function pointer which executes the condition;
Source rank—a function pointer which returns the rank;
Destination rank—a function pointer which returns the rank; and
number of bytes—function pointer, if necessary.

Table 50 is stored as a part of the binary (object file) in step 66 and is made available to the MPI library. During runtime, instantiation of the Rank Mapping table 50, among other things, is performed in the function Fp. A flowchart of function Fp, in accordance with some embodiments, is shown in FIG. 6 and will be described below after the following, more general, description of what occurs in function Fp.

Figure 3:
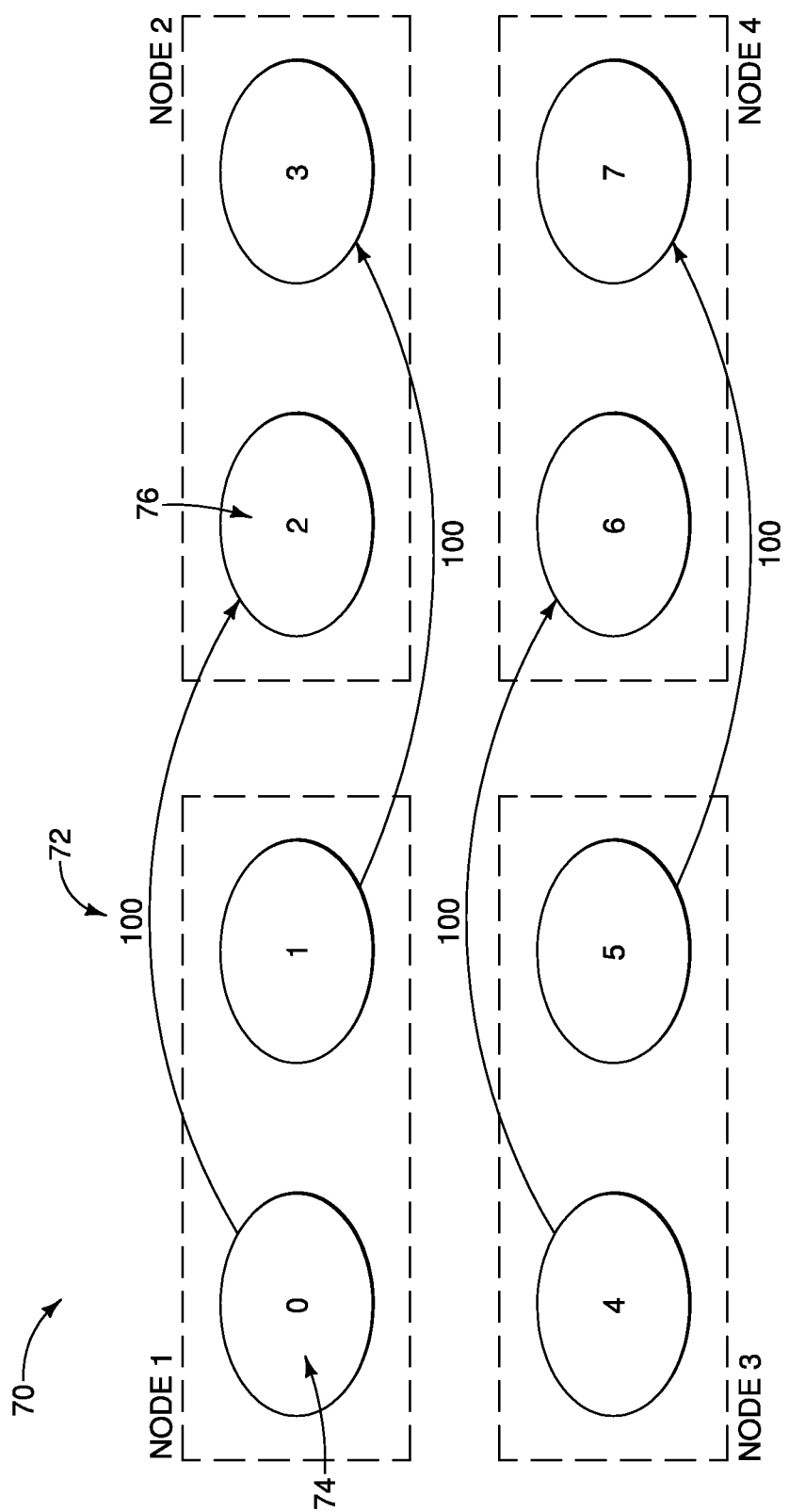
FIG. 3 is an exemplary embodiment of a rank communication graph in accordance with various embodiments.

FIG. 3 shows an exemplary embodiment of a communication graph 70 for a 4-node, 2-way system, referred to herein as a rank communication graph. During instantiation, a goal is to create the actual communication graph 70. In order to do this, one graph node is created for the current rank of the process. This is an abstract graph node for graph partitioning, not a physical processor or core node as shown in FIG. 1. For each entry of the Rank Mapping Table, the table is traversed and the conditional is evaluated (e.g., the function pointers are executed to evaluate the conditional).

If the conditional is TRUE, the peer communicating rank (also known as peer communicating process) is determined (e.g., function pointers are executed to evaluate the rank). If the peer communicating rank is different from the current rank, a separate graph node is created for this rank (for graph partitioning) and a graph edge is added connecting the current rank node to this new node. Then the transfer size (in bytes) 72 is added as the edge weight. Any MPI point-to-point communication call has a sender rank 74 and a destination rank 76. Peer communicating rank or process refers to the source and destination ranks that are involved in a point-to-point call. "Graph edge" refers to a simple line connecting two "graph nodes" in an abstract graph.

Evaluating the conditional refers to evaluating an 'if' statement that precedes a communication call. Where there is a 'if' condition before a communication call—based on the result of which the communication call would executed or not—such conditional is also captured. If the conditional is rank or size based, it is evaluated at runtime. On evaluation, if the result of the 'if' conditional is TRUE, that means in the actual code path the communication call would be called and hence the communication call need to be processed to determine the sender and the receiver, etc. If the 'if' conditional evaluates to FALSE, then it means that the communication call would not be called in the actual code path and hence nothing needs to be done.

For example, consider:
if(rank % 2==0)
MPI_Send( . . . );
then all those ranks that are even only will call MPI_Send so there is a need to process the MPI_Send only for even ranks. For odd ranks, nothing needs to be done.

In order to describe the function pointers for determining the peer communicating rank, consider the following example:
MPI_Send(buf,20,MPI_INT,rank+2,0,MPI_COM_WORLD)

Here the destination rank is set to be "rank+2" instead of an absolute value. Therefore these expressions need to be evaluated only at runtime. These statements that form the destination rank are captured by the compiler and transformed into a function. The pointer to this function is stored in the Rank Mapping table 50. Therefore, a function of the following sort is written by the compiler:

```
int foo(int rank)
{
    return rank + 2;
}
```

This function foo( ) is called at runtime when the actual ranks are known. After the rank communication graph 70 (FIG. 3) is created, graph partitioning is used to map the processes that should run on the same node.

In other embodiments of the invention, alternative graph partitioning systems or methods may be used. The purpose of the graph partitioning is to minimize the communication among processes which are not mapped to the same node. In the illustrated embodiment of the invention, graph partitioning methods are based on heuristic solutions, as the problem is NP-complete.

Figure 4:
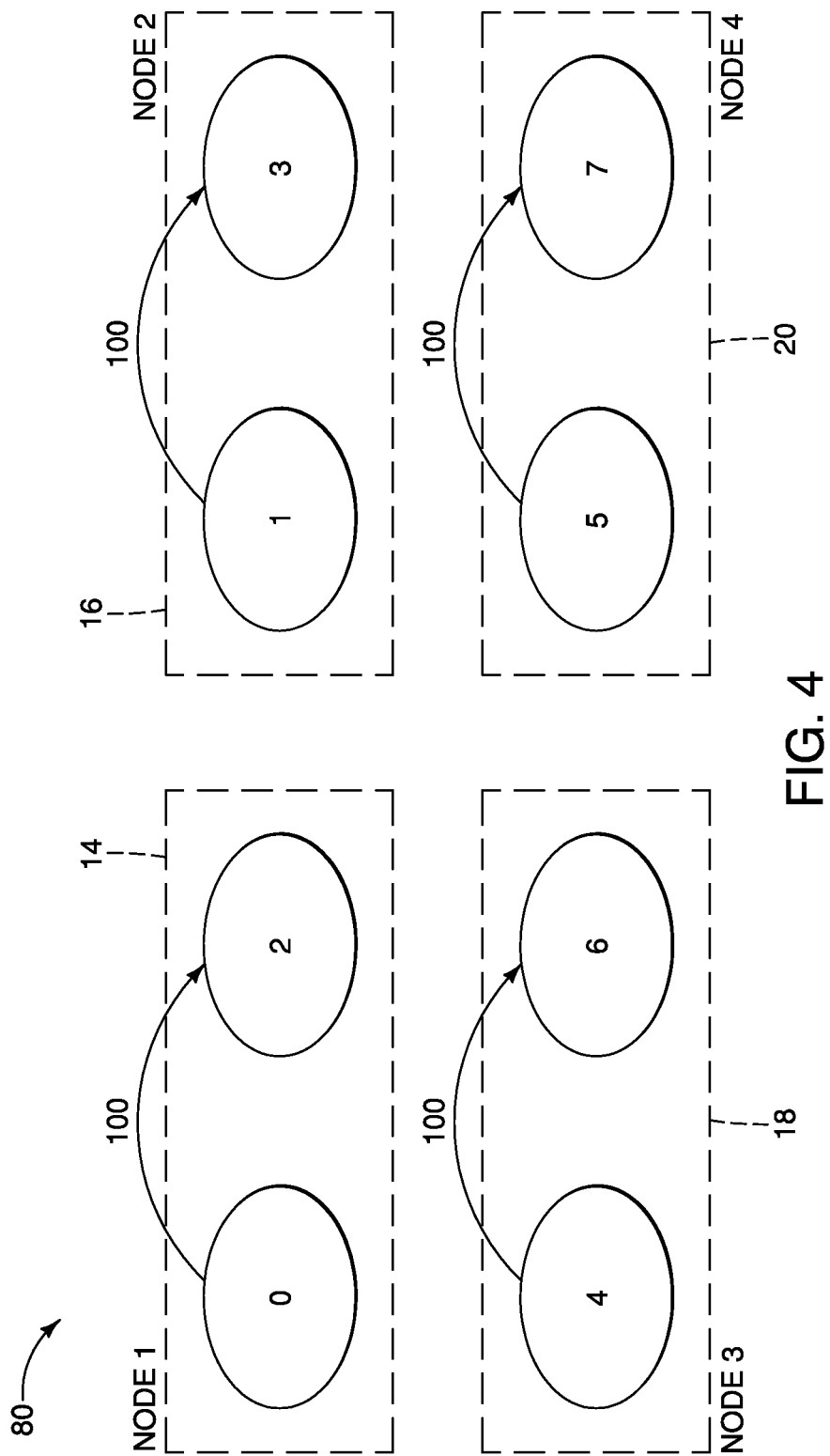
FIG. 4 is an exemplary embodiment of a rank communication graph after MPI process mapping.

FIG. 4 illustrates an exemplary embodiment of a rank communication graph 80 after MPI process mapping.

FIG. 6 is an exemplary embodiment of a flowchart of a function Fp (referred to in step 66 of FIG. 5) in accordance with some specific embodiments of the invention. The example illustrates is a very specific exemplary implementation and it should be obvious to one skilled in the art that other embodiments are, of course, possible. Function Fp is called at the entry point of the binary.

In step 90, the rank mapping table entries are filled with ranks of 0 to (the number of ranks minus one). In step 92, a while loop is initiated which continues while an entry of the rank mapping table exists to be processed. Other types of loops are, of course, possible. In step 94, the next entry is read. In step 96, the conditional function of that entry is evaluated to determine whether it is true or false. If false, the while loop started in 92 continues. If true, then the process proceeds to step 98.

In step 98, the peer communicating rank is determined. In step 100, a determination is made as to whether the peer communicating rank determined in 98 is different from the current rank. If not, the while loop started in 92 continues. If so, the process proceeds to step 102. In step 102, a determination is made as to whether a graph node (for graph partitioning) exists for the peer rank. If so, the process proceeds to step 104. If not, the process proceeds to step 106.

In step 104, the number of bytes data is added to the existing graph node. After step 104, the while loop started in step 92 continues. In step 106, a separate node is created for the peer rank. In step 108, an edge is added connecting the current rank's graph node to the new graph node with the number of bytes as the weight of the edge. After step 108, the while loop started in step 92 continues.

When the while loop terminates, step 110 executes. In step 110, graph partitioning occurs to create new mapping, then the normal program runs with the new mapping. This is a very specific exemplary implementation of processing a rank mapping table created by a compiler. It should be obvious to one skilled in the art that other implementations are, of course, possible.

Thus embodiments of the invention provide a method of mapping processes to processors in a parallel computing environment where ranks are rearranged such that more heavily communicating processes are mapped to be contained within the nodes.

Embodiments of the invention can take the form of entirely hardware elements, entirely software elements or an combination containing both hardware and software elements. In a preferred embodiment, embodiments of the invention are implemented as software elements, which include but are not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description set out above describe particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

What is claimed is:

1. A method of mapping processes to processors in a parallel computing environment where a parallel application is to be run on a cluster of nodes wherein a node in the cluster of nodes has multiple processors, the method comprising:
    reviewing, using a compiler, in a Message Passing Interface (MPI), a point-to-point communication call between a first process of a parallel application and a second process of the parallel application;
    extracting, using the compiler, from the point-to-point communication call between the first process and the second process a source rank, a destination rank, and a transfer size comprising a number of bytes;
    extracting, using the compiler, responsive to a conditional statement preceding the call, the conditional statement;
    creating, using the compiler, a table, the table comprising an entry corresponding to the call, the entry comprising the conditional statement, the source rank, the destination rank, and the number of bytes;
    embedding, using the compiler, the table into an object file, wherein the embedding makes the table available to an MPI library;
    introducing, using the compiler, a function into the entry of the table in the object file, the function operating to instantiate the table at runtime.

2. The method in accordance with claim 1 further comprising:
    creating, in a communication graph, a graph node, for graph partitioning, corresponding to a current rank;
    evaluating, for the entry of the table, the conditional statement by executing the function;
    determining, responsive to the conditional statement evaluating as true, a peer communicating rank;
    creating, responsive to the peer communicating rank being different from the current rank, a separate graph node for the peer communicating rank for graph partitioning;
    adding a graph edge connecting the graph node corresponding to the current rank node to the separate graph node corresponding to the per communicating rank; and
    adding, to the graph edge, the transfer size as an edge weight.

3. The method in accordance with claim 2 further comprising:
    applying, to the communication graph, graph partitioning, after all entries of the table have been processed, to create a new mapping, the new mapping identifying a set of processes that should be configured to execute on the node.

4. The method in accordance with claim 1, wherein the function is configured to, during execution, for the entry:
    (a) evaluate the conditional statement and, when the conditional statement evaluates as false, proceed to a next entry of the table and, when the conditional statement evaluates as true, proceed to (b);
    (b) determine a peer communicating rank and proceed to (c);
    (c) determine whether the peer communicating rank is different from a current rank, when the peer communication rank is not different from the current rank, proceed to the next entry, and when the peer communication rank is different from the current rank, proceed to (d);
    (d) determine whether a graph node exists for the peer communicating rank, and when the graph node exists for the peer communicating rank, add the transfer size as a weight, and when the graph node does not exist for the peer communicating rank, proceed to (e);
    (e) create the graph node for the peer communicating rank and proceed to (f); and
    (f) add an edge connecting the graph node corresponding to the current rank with the graph node corresponding to the peer communicating rank, and further add the transfer size as the weight of the edge.

5. The method in accordance with claim 4 further comprising:
    applying, to the communication graph, graph partitioning, after all entries of the table have been processed, to create a new mapping, the new mapping identifying a set of processes that should be configured to execute on the node.

6. The method in accordance with claim 5 and further comprising:
    executing at least some of the object code using the new mapping.

* * * * *